(12) United States Patent
Hirth et al.

(10) Patent No.: US 8,744,261 B2
(45) Date of Patent: *Jun. 3, 2014

(54) EPON WITH POWER-SAVING FEATURES

(71) Applicant: Broadcom Corporation, Irvine, CA (US)

(72) Inventors: Ryan E. Hirth, Windsor, CA (US); Edward W. Boyd, Petaluma, CA (US); Sanjay Goswami, Santa Rosa, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,221

(22) Filed: Jun. 28, 2013

(65) Prior Publication Data

US 2013/0294775 A1  Nov. 7, 2013

Related U.S. Application Data

(63) Continuation of application No. 12/577,608, filed on Oct. 12, 2009, now Pat. No. 8,498,534.

(60) Provisional application No. 61/111,465, filed on Nov. 5, 2008, provisional application No. 61/221,339, filed on Jun. 29, 2009.

(51) Int. Cl.
H04B 10/08 (2011.01)
H04B 10/20 (2011.01)
H04J 14/00 (2006.01)

(52) U.S. Cl.
USPC .................................. 398/25; 398/58; 398/72

(58) Field of Classification Search
USPC .................. 398/58, 59, 66–68, 70–72, 25
See application file for complete search history.

(56) References Cited

U.S. PATENT DOCUMENTS 6,501,574 B1  12/2002  Unno et al.
7,301,970 B2  11/2007  Kim et al.
(Continued)

FOREIGN PATENT DOCUMENTS

EP  1 801 984 A1  6/2007
EP  1 940 051 A1  7/2008
JP  2008-113193 A  5/2008

OTHER PUBLICATIONS

Trojer, E., "Power Saving Modes for GPON and VDSL2," *IEEE 802 LAN/MAN Standards Committee*, Ericsson AB, Kista, Sweden; 2008, 10 pages.

(Continued)

*Primary Examiner* — Dalzid Singh
(74) *Attorney, Agent, or Firm* — Sterne, Kessler, Goldstein & Fox P.L.L.C.

(57) ABSTRACT

A system and method for reducing power consumption in a Passive Optic Network (PON). The system comprises an optical line terminal (OLT), an optical network unit (ONU), a traffic-detection module configured to detect status of traffic to and from the ONU, and a power-management module configured to place the ONU in sleep mode based on the detected traffic status. The ONU includes transmitting and receiving components that are selectively powered down during the sleep mode based on a type of traffic in the ONU.

18 Claims, 7 Drawing Sheets

(56) References Cited

U.S. PATENT DOCUMENTS

| | | |
|---|---|---|
| 7,389,528 B1 | 6/2008 | Beser |
| 8,000,602 B2 | 8/2011 | Haran et al. |
| 8,014,674 B2 | 9/2011 | Gao et al. |
| 2006/0013138 A1 | 1/2006 | Haran et al. |
| 2006/0029389 A1 | 2/2006 | Cleary et al. |
| 2009/0141661 A1 | 6/2009 | Li et al. |
| 2010/0111523 A1 | 5/2010 | Hirth et al. |

OTHER PUBLICATIONS

Extended European Search Report directed to related E.P. Application 09825184.6-2515, dated Nov. 22, 2012, 7 pages.

International Search Report directed toward related International Application No. PCT/US2009/060691, mailed Apr. 30, 2010 from the Korean Intellectual Property Office, Daejeon, Republic of Korea; 2 pages.

International Preliminary Report on Patentability with Written Opinion directed toward related International Application No. PCT/US2009/060691, mailed May 10, 2011 from the International Bureau of WIPO, Geneva, Switzerland; 6 pages.

EPON WITH POWER-SAVING FEATURES

BACKGROUND

RELATED APPLICATIONS

The present application is related to U.S. Non-Provisional application Ser. No. 12/577,608, U.S. Provisional Application Ser. No. 61/111,465, and U.S. Provisional Application Ser. No. 61/221,339. The present application incorporates by reference in their entirety each of the foregoing applications.

1. Field

This disclosure is generally related to an Ethernet Passive Optical Network (EPON). More specifically, this disclosure is related to power-saving features of the EPON.

2. Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE).

In the example of an Ethernet PON (EPON), communications can include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies an LLID of the destination ONU. In the upstream direction, the ONUs need to share channel capacity and resources, because there is only one link coupling the passive optical coupler to the OLT.

FIG. 1 illustrates a passive optical network including a central office and a number of customers coupled through optical fibers and a passive optical splitter (prior art). A passive optical splitter 102 and optical fibers couple the customers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs) and wavelength division multiplexing (WDM) PONs.

As the popularity of EPONs increases, the number of deployed ONUs also increases. As a result, the power consumption of each GNU can no longer be ignored, and adding power-saving features to ONU design becomes increasingly important. Because of the bursty nature of the network traffic, the ONU, or at least part of the ONU, often remains inactive for a period of time. For example, the transmitter of the ONU might remain inactive unless the user is sending data packets upstream, and the receiver of the ONU might remain inactive unless the user is receiving downstream traffic. Other parts of the ONU, such as the components responsible for packet processing, media access control (MAC), error correction, etc., also may remain idle when no data traffic occurs. These idling components might consume a significant amount of power. Moreover, EPONs increasingly are carrying critical services, such as voice-over-IP (VoIP) and video data, to users. Hence, it is important to prevent any dropping of traffic and to make sure the ONU is ready to operate when needed.

SUMMARY

According to an embodiment, there is provided a system for reducing power consumption in a Passive Optic Network (PON). The system may comprise an optical network unit (ONU) and an optical line terminal (OLT). The ONU may be configured to operate in a first mode and a second mode of operation. The OLT coupled to the ONU may be configured to instruct the ONU to operate in the first mode of operation based on a type of traffic in an upstream traffic or a downstream traffic. Additionally, the OLT may be configured to buffer the downstream traffic to the ONU and disable a queue for the downstream traffic during the first mode of operation.

According to another embodiment, there is provided an example method for reducing power consumption in a Passive Optic Network (PON). The method may include operating an ONU in a first mode or a second mode of operation. In addition, the method may include instructing the ONU, using an optical line terminal (OLT), to operate in the first mode of operation based on a type of traffic in an upstream traffic or a downstream traffic. The method may then include buffering the downstream traffic to the ONU and disabling a queue for the downstream traffic during the first mode of operation.

According to another embodiment, a system may comprise a first network equipment and a second network equipment that may be coupled to the first network equipment. The second network equipment may be configured to enable a first mode or a second mode of operation of the first network equipment based on a status of traffic. During the first mode of operation, the second network equipment may be configured to buffer a downstream traffic to the first equipment and disable a queue for the downstream traffic.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

To save power consumed by an ONU, it is desirable for the ONU to power down, at least partially, during idling time periods or to power down its idling components. In addition to powering down ("going to sleep"), the ONU also needs to be able to turn on ("wake up") when it is no longer in the idle mode. Embodiments of the present invention provide a system that can select an ONU to be placed in a sleep cycle based on the ONU's traffic status. The system can power down the entire or part of the ONU or the transmitter of the ONU when link traffic is light and no time-critical traffic is detected. In one embodiment, the ONU "wakes up" when traffic is detected. To avoid traffic loss, in some embodiments, the upstream and downstream traffic are buffered by the ONU and the OLT, respectively.

Sleep Cycles

Figure 1:
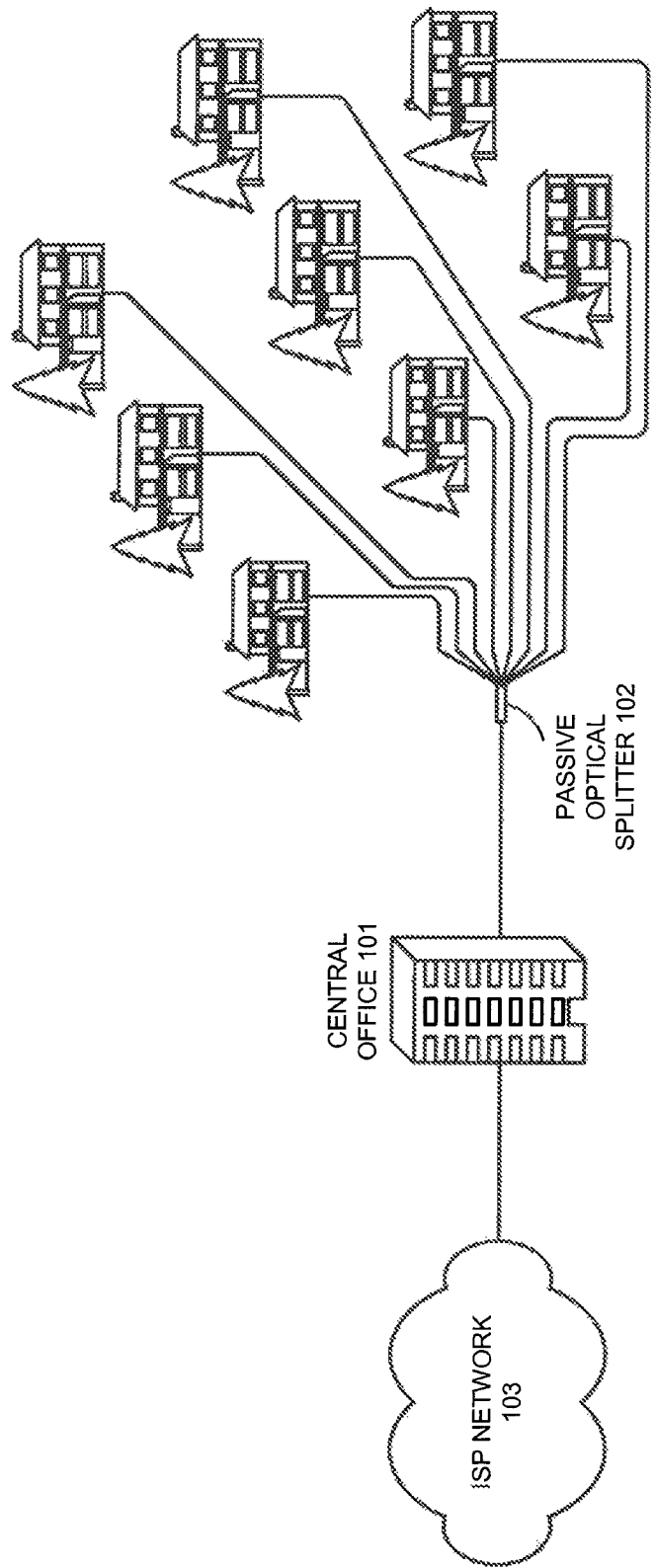
FIG. 1 presents a diagram illustrating a PON wherein a central office and a number of customers are coupled through optical fibers and a passive optical splitter (prior art).
Figure 2:
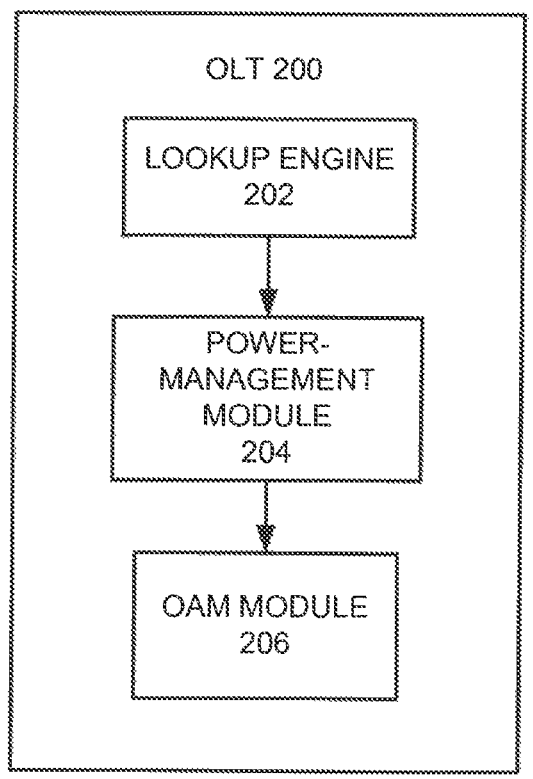
FIG. 2 presents a block diagram illustrating the architecture of an exemplary OLT in accordance with an embodiment of the present invention.

In some embodiments, the OLT monitors traffic status of all ONUs and determines their sleep eligibility. An ONU can be eligible for entering sleep cycles if the ONU traffic is low and no time-critical traffic is present. For example, this would be the case when the ONU traffic only contains Operations, Administration, and Management (OAM) traffic, Internet Control Message Protocol (ICMP), or spanning traffic. FIG. 2 presents a block diagram illustrating the architecture of an exemplary OLT in accordance with an embodiment of the present invention. An OLT 200 includes a lookup engine 202, a power-management module 204, and an OAM module 206.

During operation, OLT lookup engine 202 can characterize the traffic on the upstream and downstream links using rule-based statistics. The OLT selects ONUs for entering sleep cycles based on the characterized ONU traffic. For example, if the OLT determines that the traffic rate to and from an ONU is low based on the statistics, and no time-critical frames/packets are present, OLT power-management module 204 can put the ONU in sleep cycles. In one embodiment, OAM module 206 generates an OAM message, which is sent to the ONU to enable an ONU to enter sleep cycles. During the ONU's sleep duration, the OLT buffers the downstream unicast and broadcast traffic, while continues to transmit the multicast traffic downstream. Note that the rule-based statistics only increment for application traffic, such as VoiP or video data, and remain unchanged for network management traffic. Hence, although the ONU may detect the presence of upstream traffic, the OLT can still determine whether to put the ONU in sleep cycles based on the types of traffic received from the ONU.

The ONU sleep cycles define an ON and OFF time for the ONU. During the OFF time, one or more ONU components can be placed in sleep mode (powered down), and the sleeping-ONU buffers all upstream transmissions. In one embodiment, the ONU selected for sleep cycle also checks whether it has joined a multicast group. If the ONU determines that it has joined a multicast group, the ONU powers down only its transmitting path including the ONU transmitter and its associated control circuit. In contrast, if the ONU determines that the ONU does not have a multicast group joined, the ONU powers down both its transmitting and receiving paths. Note that in order to power down its transmitting and receiving path independently, the ONU includes separate controls for transmitter and receiver power. In a further embodiment, the high-speed serial interface, such as a SerDes, is also put in sleep mode in addition to the ONU transmitter and/or receiver.

Note that one important feature of the sleep mode is to ensure that no traffic is lost while the ONU is in sleep mode. Hence, proper packet buffering is needed. In one embodiment, the OLT buffers all broadcast traffic if the OLT determines that one or more of the coupled ONUs are in sleep mode. The OLT delays transmission of broadcast traffic until all coupled ONUs are awake. In addition, the OLT also buffers unicast traffic destined to the ONU in sleep mode. In the meantime, the ONU buffers upstream traffic.

Figure 3:
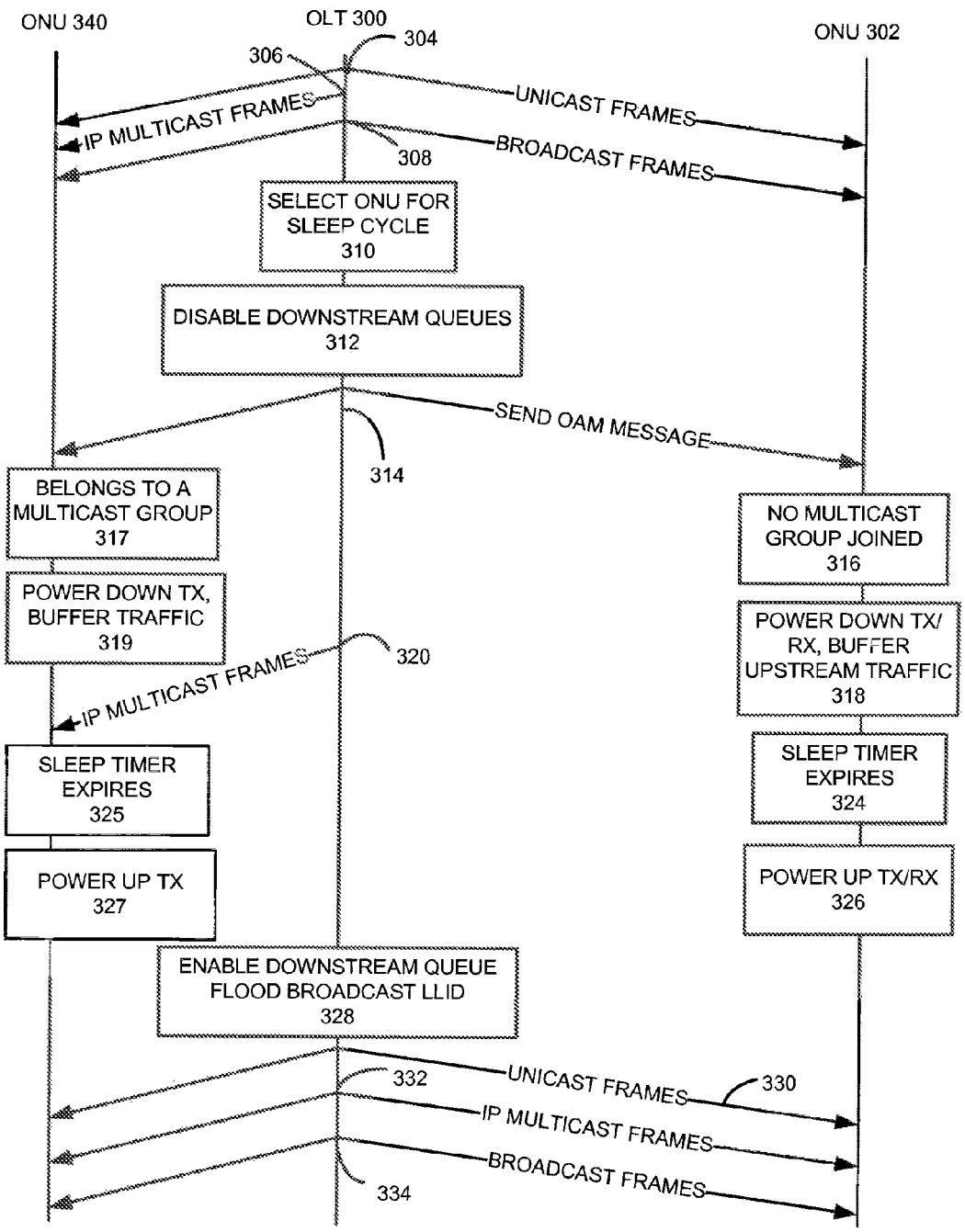
FIG. 3 presents a state diagram illustrating an ONU sleep cycle in accordance with an embodiment of the present invention.

In one embodiment, the OLT sends a message to the ONU to start the sleep cycle with a timer. Once the timer has expired, the ONU enables the transceiver interface and resumes normal transmit and receive functions. FIG. 3 presents a state diagram illustrating an ONU sleep cycle in accordance with an embodiment of the present invention. During normal operation, OLT 300 transmits unicast frames to ONUs 302 and 340 (operation 304), Internet Protocol (IP) multicast frames to ONU 340 (operation 306), and broadcast frames to ONUs 302 and 340 (operations 308). Based on traffic status, OLT 300 selects ONU 302 and ONU 340 for entering a sleep cycle (operation 310). To prepare for ONUs 302 and 340 to enter the sleep mode, OLT 300 disables its downstream unicast queues holding traffic for ONUs 302 and 340 as well as its broadcast queue (operation 312). Subsequently, OLT 300 sends an OAM message to ONUS 302 and 340 (operation 314). In one embodiment, the OAM message includes a time indicating the time period ONUs 302 and 340 should remain in sleep mode. In one embodiment, ONUs 302 and 340 receive separate OAM messages. Upon receiving the "go to sleep" OAM message, ONU 302 determines that it does not belong to any multicast group (operation 316), powers down its transceiver, and buffers its upstream traffic (operation 318). At the same time, ONU 340 determines that it belongs to a multicasting group (operation 317). As a result, ONU 340 powers down its transmitting path, and buffers its upstream traffic (operation 319). While ONUs 302 and 340 remain in the sleep mode, OLT 300 buffers all broadcast frames and unicast frames for ONUs 302 and 340, and continues to transmit multicast frames to ONU 340 (operation 320). Note that ONU 302 does not belongs to the multicast group that includes ONU 340.

Once ONU 302's sleep timer and ONU 340's sleep timer expire (operation 324 and 325), ONU 302 powers up its entire optical path (operation 326), and ONU 340 powers up its transmitting path (operation 327). OLT 300 enables its downstream unicast queue to ONUs 302 and 340, and floods broadcast LLID by transmitting all delayed broadcast frames (operation 328). Subsequently, OLT 300 resumes normal transmission by transmitting unicast frames, IP multicast frames, and broadcast frames to ONUs 302 and 340 (operations 330-334).

Figure 4:
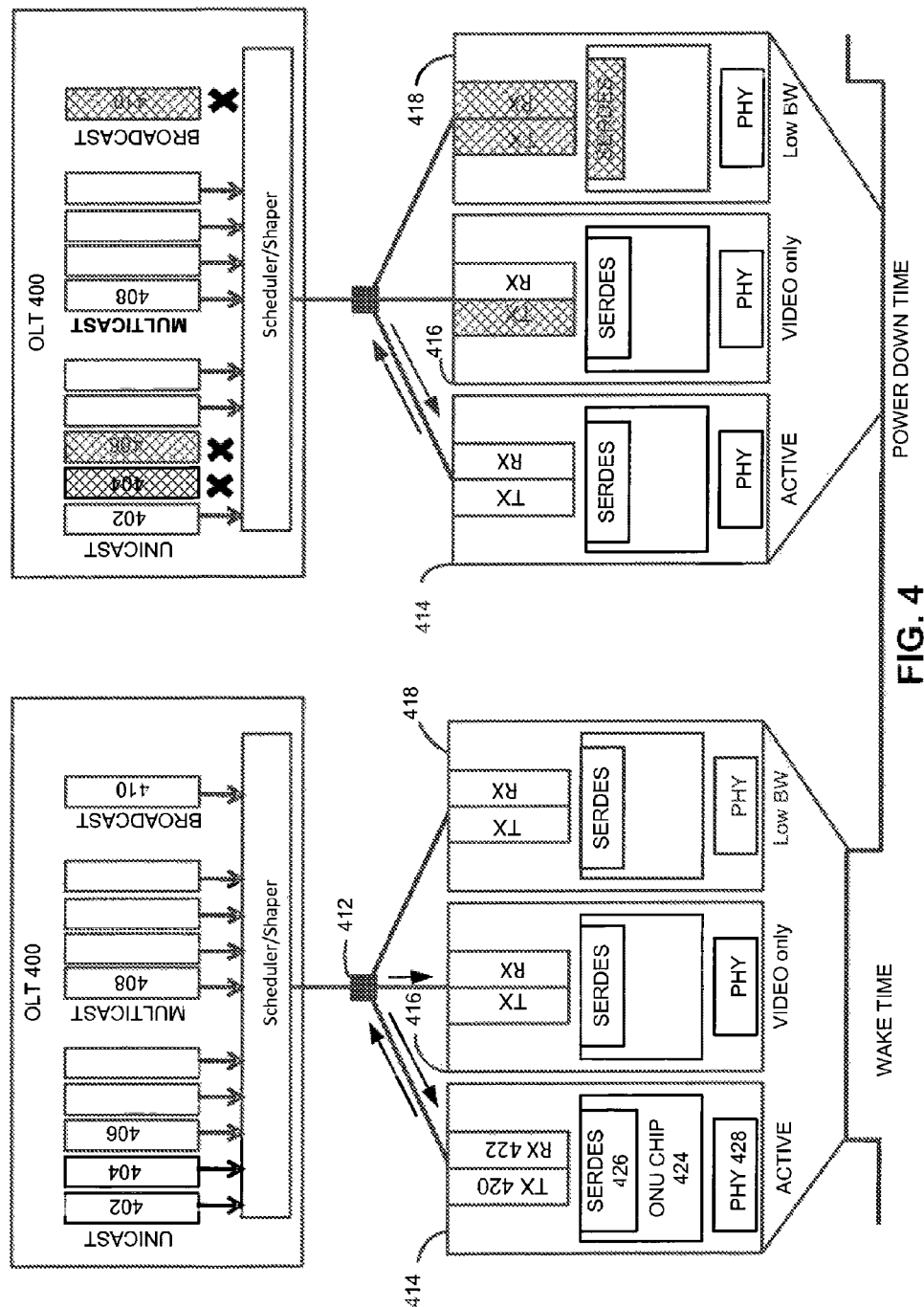
FIG. 4 presents a diagram illustrating the status of the OLT and the ONU during the ON and OFF time of a sleep cycle in accordance with an embodiment of the present invention.

FIG. 4 presents a diagram illustrating the status of the OLT and the ONU during the ON and OFF time of a sleep cycle in accordance with an embodiment of the present invention. OLT 400 includes a number of queues including unicast queues, such as queues 402-406, multicast queues, such as queue 408, and a broadcast queue 410. OLT 400 couples to a number of downstream ONUs, including ONUs 414-418, via a passive optical splitter 412. OLT unicast queues 402, 404, and 406 stores unicast traffic destined to ONU 414, 416, and 418, respectively. Each ONU includes a transmitter, a receiver, an ONU chip that includes a high-speed interface, and an Ethernet physical layer (PHY) interface. For example, ONU 414 includes a transmitter 420, a receiver 422, an ONU chip 424 which includes a serializer/deserializer (SERDES) 426, and a PHY interface 428.

During operation, OLT 400 determines which ONU is eligible to be placed in sleep mode. ONU 414 is active by transmitting upstream and receiving downstream traffic, and is not eligible for sleep. ONU 416 only receives downstream multicasting traffic, thus being eligible for sleep. For example, the subscriber might be watching TV. ONU 418 exhibits low traffic bandwidth, thus also being eligible for sleep.

During the wake time (the ON time) of a sleep cycle, all queues in OLT 400 are enabled, and all ONUs are powered up including the ONUs' transmitting and receiving paths. In one embodiment, the ONU wake time is set as 30 ms. During the power down time (the OFF time) of the sleep cycle. ONUs 416 and 418 are placed in the sleep mode. Accordingly, OLT 400 disables its unicast queues 404 and 406, and its broadcast queue 410. Because ONU 416 receives multicasting traffic, ONU 416 only powers down its transmitting path. ONU 418 powers down both of its transmitting and receiving path. In addition, ONU 418 may powers down its SERDES. In one embodiment, the power down time is set for 200 ms.

Figure 5:
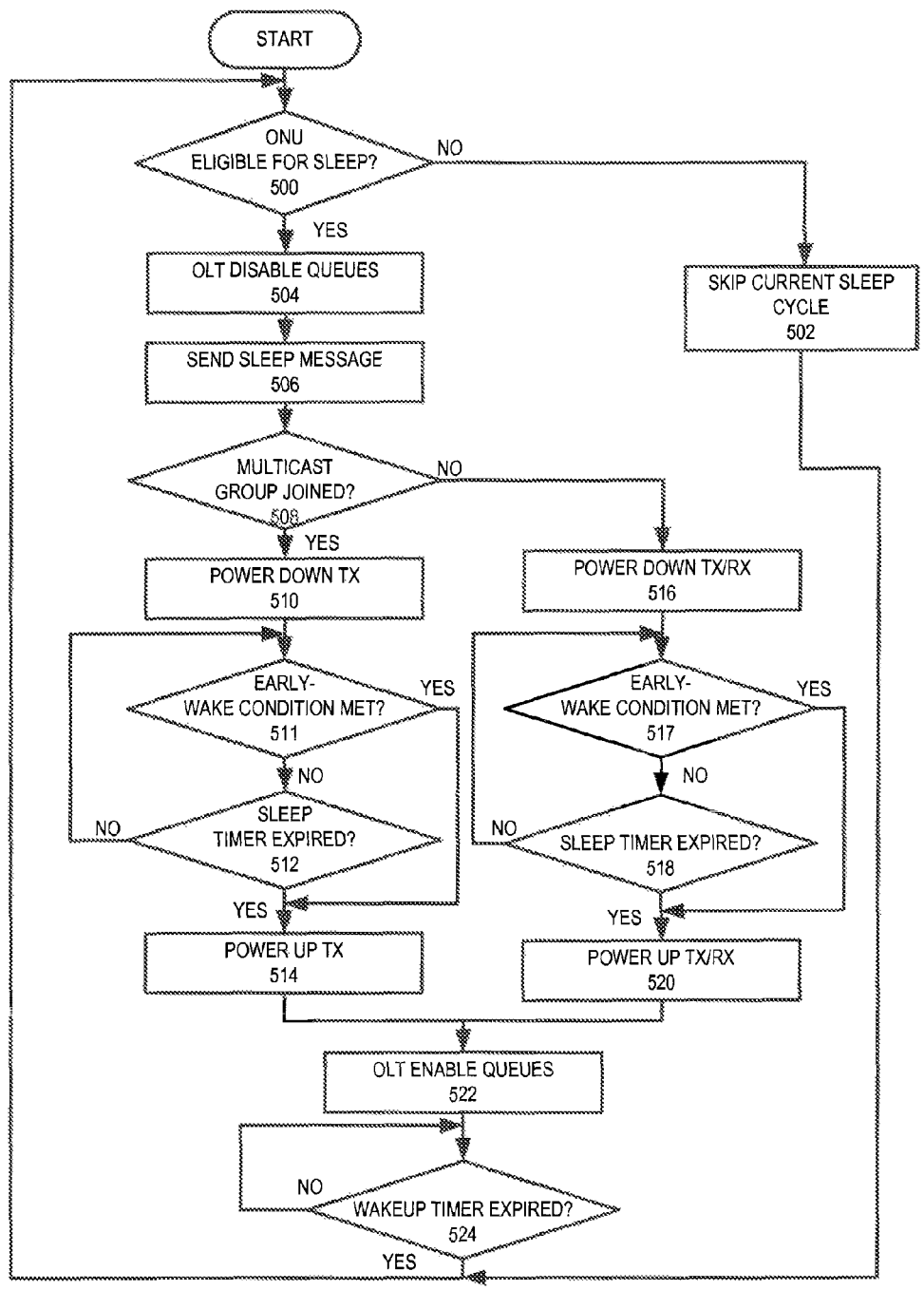
FIG. 5 presents a flow chart illustrating the process of a sleep cycle in accordance with an embodiment of the present invention.

FIG. 5 presents a flow chart illustrating the process of a sleep cycle in accordance with an embodiment of the present invention. At the beginning of the sleep cycle, the OLT determines whether the ONU is eligible for sleep (operation 500). If not, the ONU is skipped for this sleep cycle (operation 502). Otherwise, the OLT disables its downstream broadcast queue and unicast queue for the ONU to disable downstream broadcast and unicast traffic (operation 504), and sends a sleep message to the ONU (operation 506). Upon receiving the sleep message, the ONU determines whether it has joined any multicast group (operation 508). If so, the ONU powers down its upstream transmit optical path component, such as a transmitter, and disables its upstream traffic to the OLT (operation 510). During sleep, the ONU determines whether an "early-wake" condition is met (operation 511). In one embodiment, the "early-wake" conditions include, but are not limited to: time-critical upstream traffic detected, new multicast group joined (such as IPTV channel change is detected), an alarm condition (e.g., dying gasp alarm), and that an upstream queue has crossed certain threshold. If so, the ONU initializes an "early-wake" operation by powering up its upstream optical path components and enables upstream traffic to the OLT (operation 514). If not, the ONU determines whether its sleep timer is expired (operation 512). Note that the sleep time defines a time period that the ONU stays power down. If so, the ONU powers up its upstream optical path components and enables upstream traffic to the our (operation 514). Otherwise, the system returns to operation 511.

If the ONU determines that it has not joined a multicast group (operation 508), the ONU powers down its upstream and downstream optical path components, such as a transmitter and a receiver, and disables upstream traffic to the OLT (operation 516). During sleep, the ONU determines whether an "early-wake" condition is met (operation 517). If so, the ONU initializes an "early-wake" operation by powering up all of its optical path components and enables traffic to and from the OLT (operation 520) If not, the ONU further determines whether its sleep timer is expired (operation 518). If so, the ONU powers up all of its optical path components and enables traffic to and from the OLT (operation 520). Otherwise, the system returns to operation 517.

After the ONU power up, the OLT enables its unicast and broadcast queues to enable its downstream transmission to the ONU (operation 522). The OLT then waits for its wakeup timer to expire (operation 524). Note that the wakeup timer defines a time period that the ONU stays awake. After the expiration of the wakeup timer, a new sleep cycle can start.

The maximum time for an ONU to remain in the sleep mode can be limited by the buffer capacity of the OLT and the ONU and other user considerations. There is a tradeoff between the amount of power saved and the risk of losing user traffic or delay of user applications. If the time interval between two sleep cycles (corresponding to a maximum sleep time) is too short, the amount of power saved can be limited. On the other hand, a longer time interval between two consecutive sleep cycles increases the risk of the loss of user traffic due to OLT or ONU buffer overflow.

In addition to the maximum sleep time, the ONU can also notify the OLT of its minimum sleep time. The minimum sleep time of the ONU may be determined by the turn-on time of its transmitter (the time required for the transmitter to stabilize after power-on). If the OLT determines that the time interval between the ONU power-off and the next scheduled ONU wake-up is less than the minimum ONU sleeping time, the OLT may prevent the ONU from entering the sleep mode. Note that the turn-on time of the ONU transmitter is determined by the type of lasers used, and the ONU can notify the OLT about such a parameter via an OAM message or a multipoint control protocol (MPCP) extension message. In addition to using the laser turn-on time to set the ONU minimum sleep time, in one embodiment, the OLT is configured to take into consideration the laser turn-on time when scheduling its transmission after a downstream ONU wakes up. For example, if an ONU is scheduled to come out of sleep mode at a time $t_0$, and the OLT knows the turn-on time of the ONU laser is $\Delta t$, then the OLT will schedule the ONU's upstream transmission at a time later than $t_0 + \Delta t$.

It is also possible to allow the ONU to synchronize its power-down cycle with the MPCP ONU-polling cycle, which can be adaptively adjusted based on the ONU traffic status. In one embodiment, the OLT periodically polls the ONU for its status. If the ONU reports no traffic within one ONU polling cycle, the OLT can instruct the ONU to "go to sleep" or to power down until the scheduled time for the next ONU polling. Furthermore, the OLT can decrease the ONU polling rate, or increase the waiting time before the next ONU polling, if the ONU reports no traffic at a following polling time. Once the ONU reports the presence of traffic, the OLT instructs the ONU to "wake up," and resumes its original ONU polling rate.

Note that, because the ONU monitors and reports traffic at each polling time, alternatively the ONU can wake up on its own without receiving an instruction from the OLT. In certain cases, one ONU is assigned with multiple LLIDs all sharing the same transmitter and receiver. In order to save power, the OLT can group the multiple LLIDs together, and send a REPORT for these LLIDs in the same polling cycle. The OLT instructs the ONU to enter sleep mode if all LLIDs report zero traffic.

Sleep/Wake Up on Detection

Figure 6:
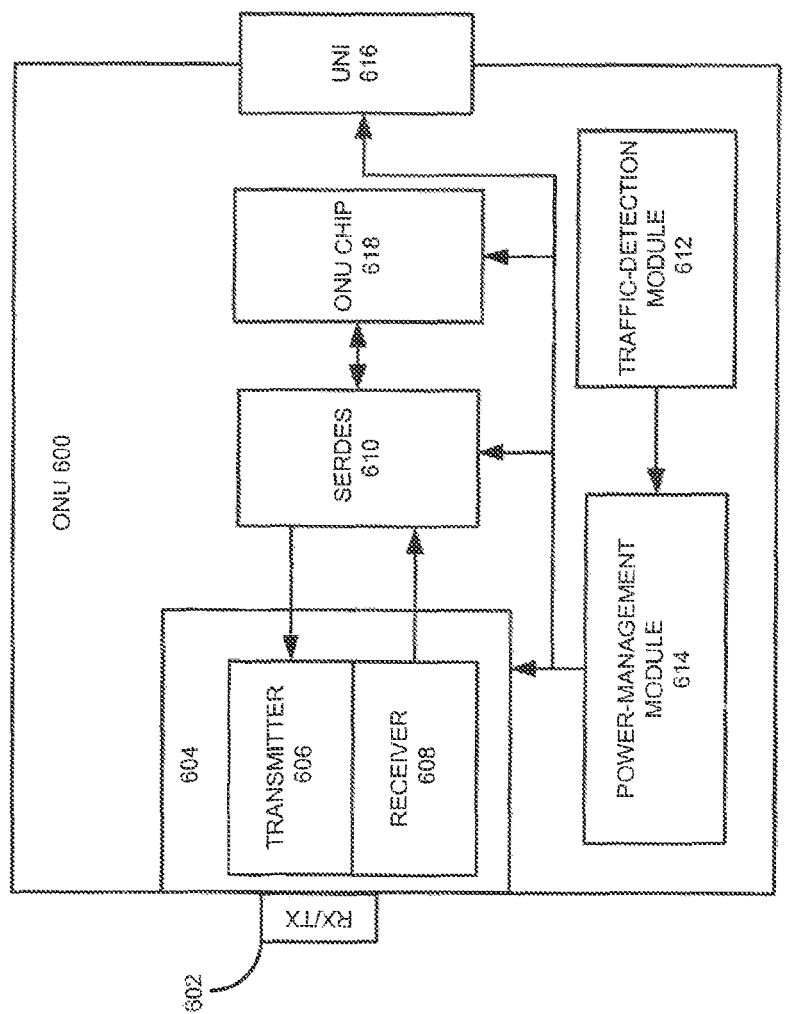
FIG. 6 presents a block diagram illustrating the architecture of an exemplary ONU in accordance with an embodiment of the present invention.

In some embodiments, the system determines whether to allow the ONU to enter sleep mode based on the ONU monitoring the user traffic, FIG. 6 presents a block diagram illustrating the architecture of an exemplary ONU in accordance with an embodiment of the present invention. In FIG. 6, an ONU 600 includes an optical interface 602 for coupling to an optical fiber, an optical bi-directional transceiver 604 coupled to optical interface 602, a Serializer/Deserializer (SerDes) 610, a traffic-detection module 612, a power-management module 614, a user-to-network interface (UNI) 616 for receiving user data, and an ONU chip 618 which is implemented in an application-specific integrated circuit (ASIC).

Optical bi-directional transceiver 604 includes an optical transmitter 606 and an optical receiver 608. Through optical interface 602, optical transmitter 606 transmits optical signals to the optical fiber and optical receiver 608 receives optical signals from the same optical fiber. A high-speed serial interface, such as a SerDes 610 is coupled to optical transceiver 604.

Traffic-detection module 612 can detect the status of the UNI link coupled to UNI 616. For example, if no Ethernet cable is plugged in UNI 616, traffic-detection module 612 detects that the UNI link is down. In such a case, ONU 600 can go into sleep mode since it is not in use. In one embodiment, ONU 600 goes into sleep mode by powering down a number of components including transmitter 606, receiver 608, SerDes 610, ONU chip 618, and other components that may consume power. However, while in sleep mode, ONU 600 is still able to monitor the link status of UNI 616. For example, traffic-detection module 612 can remain awake while the rest of ONU 600 goes into sleep mode. Once the link status of UNI 616 is up, such as an Ethernet cable being plugged in UNI 616, ONU 600 is able to come out of the sleep mode (wake up).

In addition to detecting the UNI link status, traffic-detection module 612 can also detect whether ONU 600 is receiving any upstream traffic from the user via UNI 616. In one embodiment, if it is determined that ONU 600 has not received any upstream traffic for a certain amount of time, power-management module 614 can put transmitter 606 and its associated control circuit in sleep mode. Note that in such a case the OLT still keeps ONU 600 registered although the OLT is not receiving reports back from ONU 600 for polling. When traffic-detection module 612 detects the presence of upstream traffic, power-management module 614 wakes up transmitter 606 and its associated control circuit. Transmitter 606 then starts to transmit traffic upstream to the OLT.

To avoid multicast traffic loss, in one embodiment, traffic-detection module 612 also detects the presence of multicast traffic by detecting whether ONU 600 has joined a multicast group. If it is determined that ONU 600 does not belong to any multicast group, power-management module 614 can put receiver 608 in sleep mode. While ONU 600 is in sleep mode, traffic-detection module 612 continues to detect whether ONU 600 joins a multicast group, and if traffic-detection module 612 detects a new multicast join, ONU 600 will be brought out of sleep mode.

Figure 7:
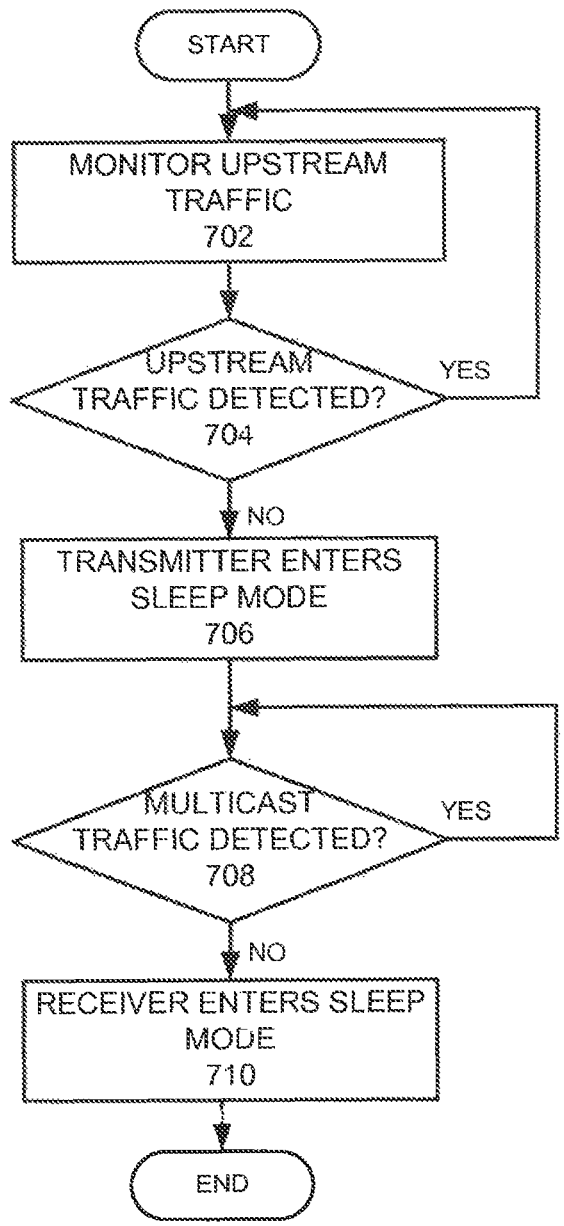
FIG. 7 presents a flow chart illustrating a process of an ONU going to sleep mode in accordance with one embodiment of the present invention.

FIG. 7 presents a flow chart illustrating a process of an ONU going to sleep mode in accordance with one embodiment of the present invention. During operation, the ONU (periodically) monitors its upstream traffic (operation 702), and determines whether upstream traffic is present (operation 704). If no upstream traffic is present, the ONU transmitter enters sleep mode (operation 706). The ONU also detects whether multicast traffic is present (operation 708), and if not, the ONU receiver enters sleep mode (operation 710).

In one embodiment, when the only traffic received by an ONU in sleep mode is network management traffic, such as simple network management protocol (SNMP) messages, spanning tree protocol (STP) messages, Internet control message protocol (ICMP) messages, etc., and no application data, such as VoIP and video, is present, the ONU can periodically wake up to process downstream broadcast and any management packets, and then go back to sleep afterward.

In some embodiments, the ONU also includes a power meter that measures the ONU's power usage. The power meter can measure the ONU's power usage during its wake and sleep times, and calculate an estimate of the power consumed by the ONU. In one embodiment, the ONU can report its power usage statistics to the OLT via an OAM message or a simple network management protocol (SNMP) message.

In some embodiments, the network management system (NMS) has the ability to enable/disable the power-saving feature of each individual ONUs. In addition, the power-management module reports to the NMS the total time an ONU has been placed in the sleep mode as well as the amount of power saved during such time period. Based on such statistics, the NMS may decide to enable/disable the power-saving feature of the ONU. Moreover, the NMS can configure the traffic-detection module by selecting the types of traffic that can be buffered and processed later when an ONU is in the sleep mode.

The data structures and code described in this detailed description are typically stored on a computer-readable storage medium, Which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system comprising:
an optical network unit (ONU) configured to operate in a first mode or a second mode of operation;
an optical line terminal (OLT) coupled to the ONU, the OLT being configured to:
instruct the ONU to operate in the first mode of operation based on a type of traffic in upstream traffic or downstream traffic,
buffer the downstream traffic to the ONU during the first mode of operation, and
disable a queue for the downstream traffic during the first mode of operation, the queue being located in the OLT; and
a traffic-detection module configured to:
determine the type of traffic in the upstream traffic or the downstream traffic; and
determine whether multicast traffic, is transmitted, to the ONU in response to the instruction to operate in the first mode of operation.

2. The system of claim 1, wherein the OLT is further configured to:
instruct the ONU to operate in the first mode of operation in response to the upstream traffic and the downstream traffic being absent in the ONU; and
instruct the ONU to operate in the second mode of operation in response to the upstream traffic or the downstream traffic being present in the ONU.

3. The system of claim 1, wherein the first mode of operation is a sleep mode and the second mode of operation is an active mode.

4. The system of claim 1, wherein the OLT comprises:
a power-management module configured to instruct the ONU to operate in the first mode of operation; and
an Operations, Administration, and Management (OAM) module configured to generate an OAM message for the ONU, the OAM message comprising:
the instruction to operate in the first mode of operation; and
a time duration for the ONU to operate in the first mode of operation.

5. The system of claim 1, wherein, during the first mode of operation, the ONU is configured to:
power down a transmitting component of the ONU in response to the multicast traffic being transmitted to the ONU; or
power down a transceiving component of the ONU in response to the multicast traffic being absent; and
buffer the upstream traffic.

6. The system of claim 1, wherein, during the first mode of operation, the OLT is configured to:
buffer unicast traffic; and
buffer broadcast traffic.

7. The system of claim 1, wherein the queue for the downstream traffic comprises:
a queue for unicast traffic;
a queue for broadcast traffic; and
a queue for multicast traffic.

8. The system of claim 1, wherein the ONU comprises a power-management module configured to instruct the ONU to operate in the first mode of operation based on a status of a user's traffic.

9. A method comprising:
operating an optical network unit (ONU) in a first mode or a second mode of operation;
instructing the ONU, using an optical line terminal (OLT), to operate in the first mode of operation based on a type of traffic in upstream traffic or down stream traffic;
buffering the downstream traffic to the ONU during the first mode of operation;
disabling a queue for the downstream traffic during the first mode of operation, the queue being located in the OLT;
determining, using a traffic-detection module, the type of traffic in the upstream traffic or the downstream traffic; and
determining, using the traffic-detection module, whether multicast traffic is transmitted to the ONU in response to the instructing to operate in the first mode of operation.

10. The method of claim 9, further comprising using a power-management module of the OLT to instruct the ONU to operate in the first mode of operation.

11. The method of claim 9, further comprising generating, using an Operations, Administration, and Management (OAM) module, an OAM message for the ONU, the OAM message comprising:
the instruction to operate in the first mode of operation; and
a time duration for the ONU to operate in the first mode of operation.

12. The method of claim 9, further comprising:
powering down a transmitting component of the ONU in response to the multicast traffic being transmitted to the ONU; and
powering down a transceiving component of the ONU in response to the multicast traffic being absent.

13. The method of claim 9, wherein the buffering the downstream traffic comprises:
buffering unicast traffic; and
buffering broadcast traffic.

14. The method of claim 9, wherein the disabling the queue comprises:
disabling a queue for unicast traffic;
disabling a queue for broadcast traffic; and
disabling a queue for multicast traffic.

15. The method of claim 9, further comprising instructing the ONU, using a power-management module in the ONU, to operate in the first mode of operation based on a status of a user's traffic.

16. A system comprising:
a first network equipment;
a second network equipment coupled to the first network equipment, the second network equipment being configured to:
enable a first mode or a second mode of operation of the first network equipment based on a type of traffic in upstream traffic or downstream traffic, buffer downstream traffic to the first equipment during the first mode of operation, and disable a queue for the downstream traffic during the first mode of peration; and a traffic-detection module configured to:
determine the type of traffic in the upstream traffic or the downstream traffic; and
determine whether multicast traffic is transmitted to the first network equipment in response to the instruction to operate in the first mode of operation.

17. The system of claim 16, wherein:

the first network equipment is an optical network unit (ONU); and the second network equipment is an optical line terminal (OLT).

18. The system of claim 16, wherein the queue for the downstream traffic comprises:

a queue for unicast traffic;
a queue for broadcast traffic; and
a queue for multicast traffic.

* * * * *

UNITED STATES PATENT AND TRADEMARK OFFICE
CERTIFICATE OF CORRECTION

| | | |
|---|---|---|
| PATENT NO. | : 8,744,261 B2 | Page 1 of 1 |
| APPLICATION NO. | : 13/931221 | |
| DATED | : June 3, 2014 | |
| INVENTOR(S) | : Hirth et al. | |

It is certified that error appears in the above-identified patent and that said Letters Patent is hereby corrected as shown below:

In the Claims

Column 9, line 36, claim 1, please delete "," after --traffic--.

Column 9, line 36, claim 1, please delete "," after --transmitted--.

Column 10, line 19, claim 9, please replace "down stream" with --downstream--.

Column 11, line 4, claim 16, please replace "peration" with --operation--.

Signed and Sealed this
Nineteenth Day of August, 2014

Michelle K. Lee
*Deputy Director of the United States Patent and Trademark Office*